(12) United States Patent
Hsiao et al.

(10) Patent No.: US 8,929,028 B2
(45) Date of Patent: Jan. 6, 2015

(54) PERPENDICULAR MAGNETIC WRITE HEAD HAVING A LAMINATED TRAILING RETURN POLE

(75) Inventors: Wen-Chien D. Hsiao, San Jose, CA (US); Yimin Hsu, Sunnyvale, CA (US); Jennifer Leung, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 515 days.

(21) Appl. No.: 12/975,121

(22) Filed: Dec. 21, 2010

(65) Prior Publication Data

US 2012/0154954 A1 Jun. 21, 2012

(51) Int. Cl.
*G11B 5/147* (2006.01)
*G11B 5/127* (2006.01)
*G11B 5/31* (2006.01)

(52) U.S. Cl.
CPC .............. *G11B 5/1278* (2013.01); *G11B 5/315* (2013.01)
USPC ............ 360/125.08; 360/125.12; 360/125.16; 360/125.24; 360/125.26; 360/125.5

(58) Field of Classification Search
USPC ............. 360/125.08, 125.12, 125.16, 125.24, 360/125.26, 125.5
See application file for complete search history.

(56) References Cited

U.S. PATENT DOCUMENTS

| | | | |
|---|---|---|---|
| 4,740,855 A | 4/1988 | Diepers et al. | |
| 4,873,599 A | 10/1989 | Sueoka | |
| 5,576,098 A | 11/1996 | Arimoto et al. | |
| 6,301,075 B1 * | 10/2001 | Sato | 360/125.5 |
| 6,800,178 B2 | 10/2004 | Westwood | |
| 7,295,401 B2 | 11/2007 | Jayasekara et al. | |
| 7,379,276 B2 | 5/2008 | Im et al. | |
| 7,394,620 B2 | 7/2008 | Taguchi | |
| 7,522,378 B2 * | 4/2009 | Im | 360/125.12 |
| 7,554,765 B2 | 6/2009 | Shukh et al. | |
| 7,561,379 B2 * | 7/2009 | Li et al. | 360/125.24 |
| 7,656,611 B2 | 2/2010 | Liu et al. | |
| 7,715,152 B2 | 5/2010 | Okada et al. | |
| 7,907,113 B2 | 3/2011 | Jang et al. | |
| 2005/0141137 A1 * | 6/2005 | Okada et al. | 360/122 |
| 2009/0154026 A1 | 6/2009 | Jiang et al. | |

FOREIGN PATENT DOCUMENTS

| | | |
|---|---|---|
| JP | 63247906 A | 10/1988 |
| JP | 1019510 A | 1/1989 |

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

A perpendicular magnetic write head having a laminated trailing return pole structure that reduces magnetic eddy currents in the return pole for improved write head efficiency. The trailing magnetic return pole includes multiple magnetic layers. Each magnetic layer is separated from an adjacent magnetic layer of the return pole by a non-magnetic layer. The non-magnetic layer terminates at a region that is removed from the air bearing surface in order to allow contact between the magnetic layers at the ABS, thereby preventing stray magnetic fields from emitting from the magnetic layers of the write pole.

18 Claims, 4 Drawing Sheets

PERPENDICULAR MAGNETIC WRITE HEAD HAVING A LAMINATED TRAILING RETURN POLE

FIELD OF THE INVENTION

The present invention relates to magnetic write heads and more particularly to a write head having a laminated trailing return pole structure for improved performance.

BACKGROUND OF THE INVENTION

The heart of a computer's long term memory is an assembly that is referred to as a magnetic hard disk drive. The magnetic hard disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a coil that passes through a magnetic yoke that includes a write pole located between leading and trailing return poles. Current conducted to the coil layer induces a magnetic flux in the pole pieces which causes a write field to emit from the write pole for the purpose of writing a magnetic transition in tracks on the moving media, such as in circular tracks on the rotating disk. The write field passes through a magnetically soft under-layer of the magnetic media and returns to the return poles where it is sufficiently spread out and weak that it does not erase the previously recorded bit.

In the quest for every increased data capacity and data rate, researchers have sought means for improving the performance of such magnetic write heads. Such an increase in performance can include maximizing the write field strength as well as minimizing the time necessary to switch the magnetic polarization of the poles of the magnetic write head (e.g. maximizing switching speed).

SUMMARY OF THE INVENTION

The present invention provides a perpendicular magnetic write head having a laminated return pole structure for improved magnetic performance. The return pole includes magnetic layers that are each separated from one another by a non-magnetic layer that terminates at a location that is recessed from the air bearing surface, thereby allowing the magnetic layers to contact one another at the air bearing surface while being separated from one another in a region removed from the air bearing surface.

The laminated structure of the return pole prevents eddy current formation, thereby improving the performance of the write head. If the non-magnetic lamination layers were allowed to extend all of the way to the air bearing surface a magnetic fringing field would extend from the ends of the magnetic layers in order to form a flux closure path between adjacent magnetic layers. This would then lead to stray field formation and inadvertent writing to the magnetic media. This is prevented by terminating the non-magnetic layers at a location, that is recessed from the air bearing surface.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
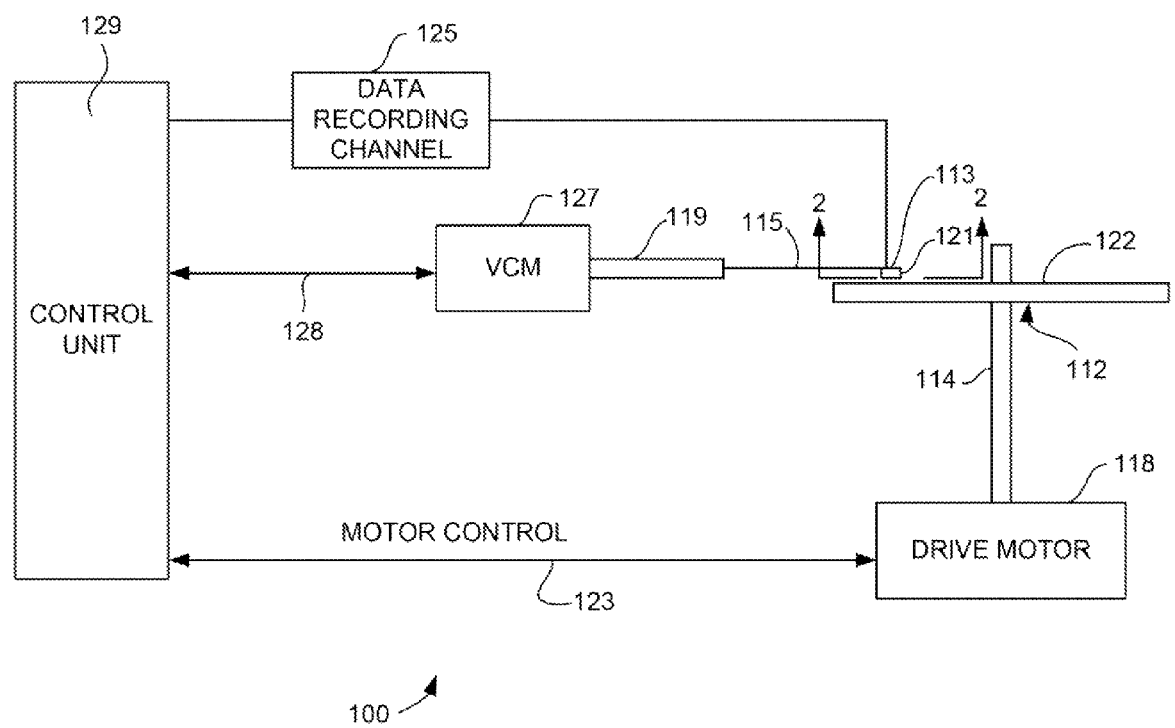
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts a force on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
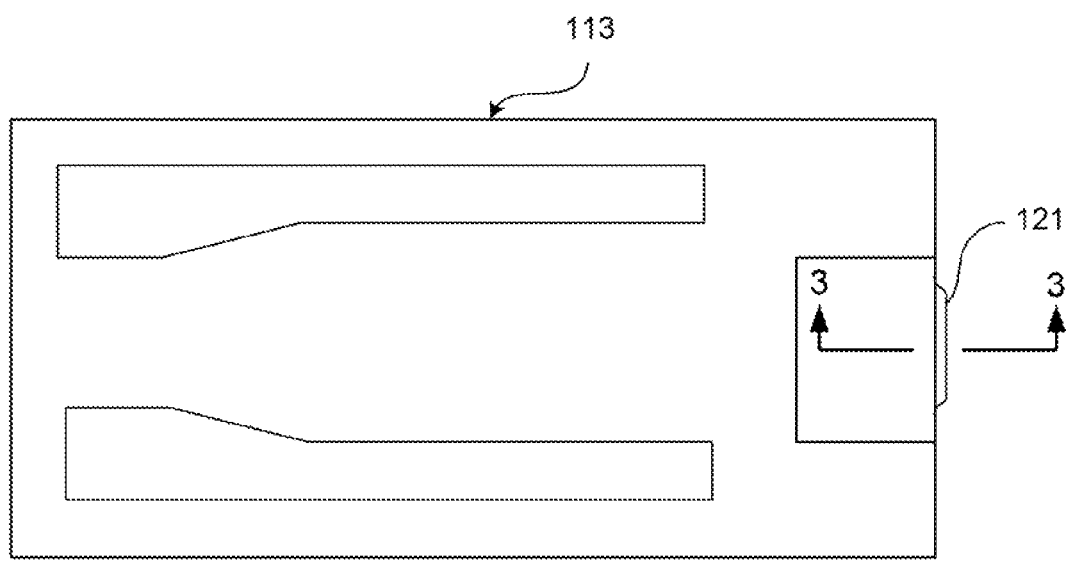
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1, are for representation purposes only. It should be apparent that disk storage systems may contain a large number of disks and actuators, and each actuator may support a number of sliders.

Figure 3:
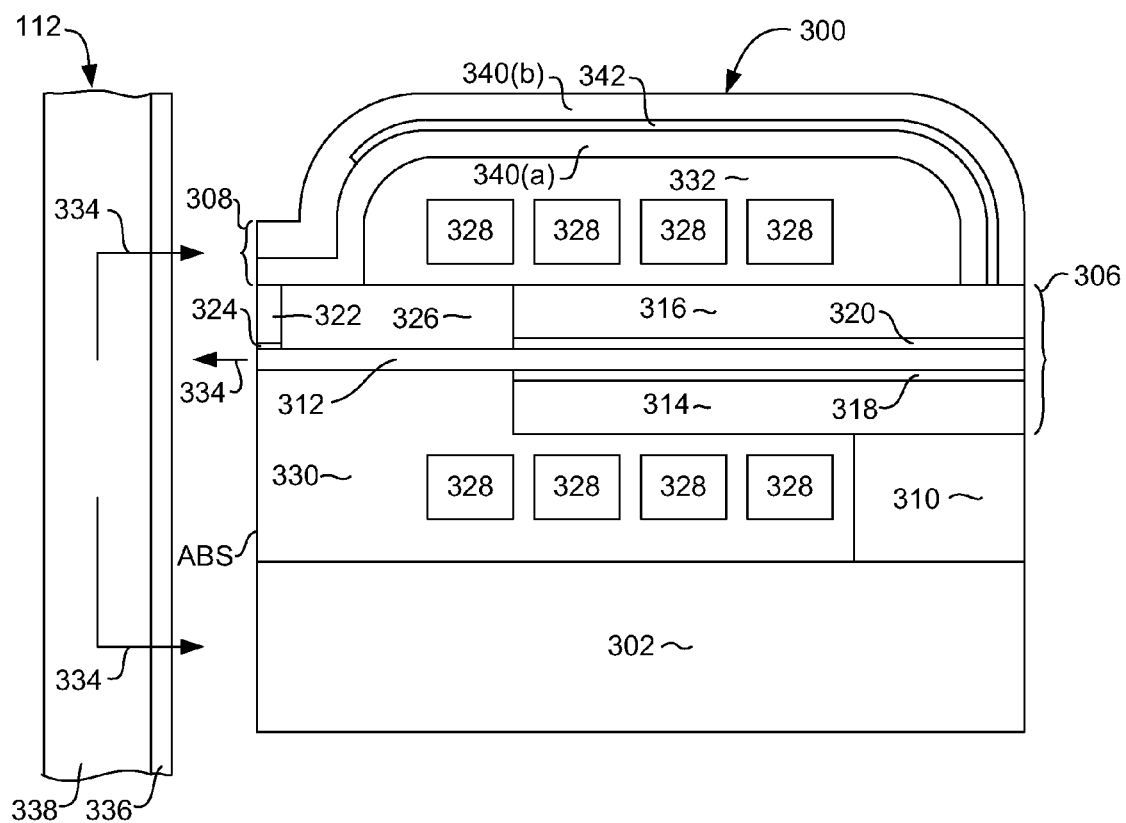
FIG. 3 is a side cross sectional view of a magnetic write head according to an embodiment of the invention.

FIG. 3 shows a magnetic write head 300 according to an embodiment of the invention. The write head includes a lower or leading magnetic return pole (P1) 302, a write pole structure (P2) 306, and an upper or trailing return pole structure (P3) 308. The leading return pole 302 can be connected with the write pole structure by a magnetic back gap layer 310.

The write pole structure 306 can include a main write pole 312 that is located between first and second shaping layers 314, 316. The main write pole 312 extends to the ABS, but the first and second shaping layers 314, 316 stop short of the ABS. The main write pole 312 can be separated from the first and second shaping layer 314, 316 by thin non-magnetic layers 318, 320, which can be, for example, alumina. Alternatively, the non-magnetic layers 320, 318 could be eliminated so that the write pole 312 contacts both of the shaping layers 314, 316. In addition, one of the shaping layers 314, 316 could be eliminated so that there is only one shaping layer.

A trailing magnetic shield 322 may be provided to improve the field gradient of the write field emitted from the write pole 312. The trailing magnetic shield 322 is separated from the trailing edge of the write pole 312 by a thin, non-magnetic trailing gap layer 324. A non-magnetic fill layer 326 such as alumina may be provided to fill the space behind the trailing shield 322. The trailing shield 322 is magnetically connected with the trailing return pole 308.

The write head 300 also includes a write coil 328. The write coil 328 can be constructed of a non-magnetic, electrically conductive material such as Cu and can be constructed as a pair of pancake coils or as a helical coil. The lower portion of the write coil 328 is embedded in a lower insulation layer 330 that can be a material such as alumina. The upper portion of the write pole 328 is embedded in an upper insulation layer 332 that can be a material such as hard baked photoresist, or could be alumina like the lower insulation layer 330.

When an electrical current flows through the write coil, a magnetic field is induced around the turns of the write coil. This causes a magnetic flux to flow through the write pole structure 306, resulting in a magnetic write field 334 being emitted from the tip of the write pole 312 in a direction that is substantially perpendicular to the ABS and to the surface of the media 112 and which locally magnetizes a hard magnetic layer 336 of the magnetic media 112. The majority of the write field 334 then travels through a magnetically softer under-layer 338 and through an air gap between 344 and 322 to the trailing magnetic shield 322. The flux return path continues with return pole 308, 340(a), 340(b), 320, 314, 322.

Therefore, reducing the flux return reluctance, such as 308, 340(a), 340(b) is beneficial in enhancing the writing switch time.

At high data rate, the eddy current increases the flux reluctance of 308, 340(a), 340(b) significantly. One way to improve the performance of the write head 300 is to reduce the eddy current loss in the trailing return pole 308, 340(a), 340(b) such as by forming the majority of the return path with lamination such as 340(a) and 340(b).

To this end, the trailing return pole 308 is constructed as a laminated structure having magnetic layers 340(a), 340(b) that are separated from one another by a thin layer of non-magnetic, dielectric material such as alumina 342, which can be deposited by a process such as atomic layer deposition, chemical vapor deposition, sputter deposition or ion beam deposition. The magnetic layers 340(a), 340(b) can be constructed of a high Bsat material such as CoFe, NiFe, which is preferably formed by electroplating.

A laminated pole structure can cause unintended writing to the magnetic media 112 if the pole 308 is laminated all of the way to the ABS. If the lamination structure were to extend all of the way to the ABS, a flux closure path would exist at the ABS forming a magnetic field at the ABS that has a component that is perpendicular to the surface of the magnetic media. This of course would be unacceptable.

The present invention solves this problem by terminating the non-magnetic layer 342 at some point short of the ABS. Therefore, while the magnetic layers 340(a), 340(b) are separated from one another in regions removed from the ABS, they are in contact with one another near the ABS.

Figure 4:
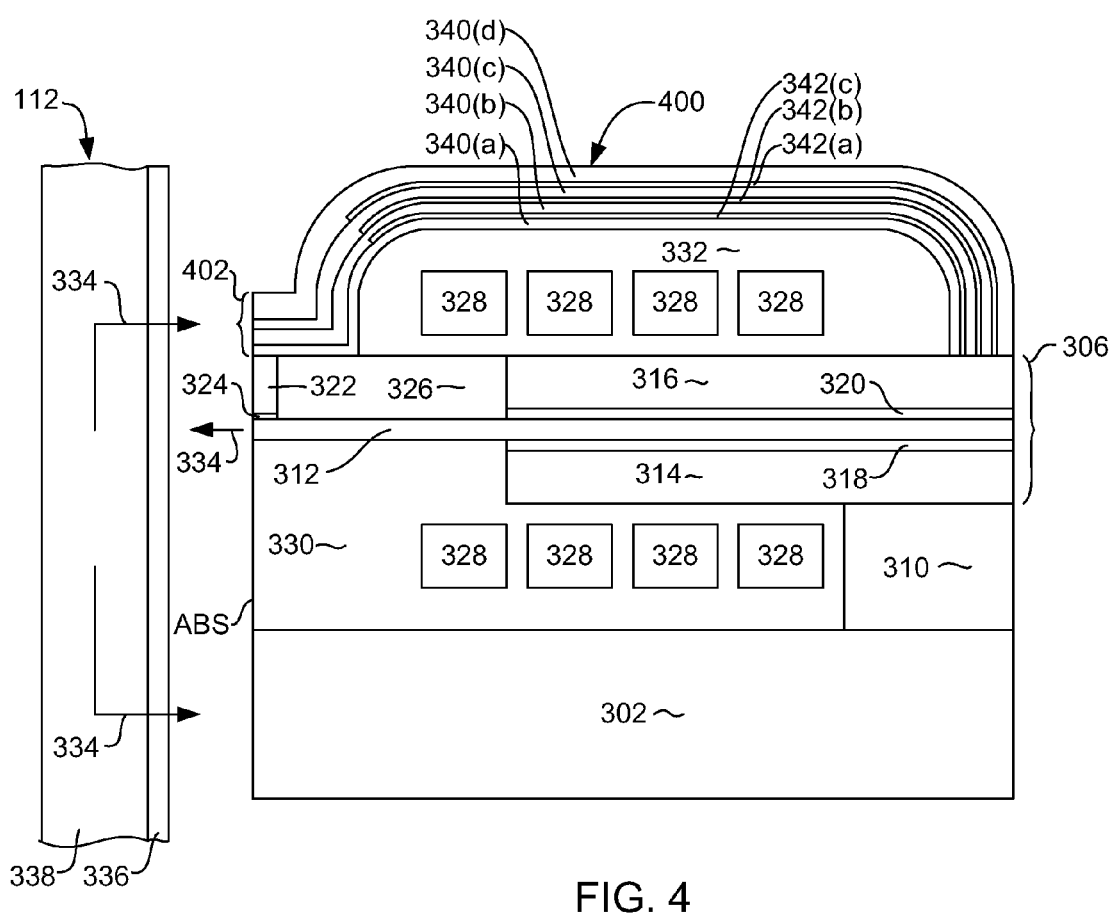
FIG. 4 is an enlarged cross sectional view of a magnetic write head according to an alternate embodiment of the invention.

FIG. 3 shows a laminated trailing return pole structure 308 that has only two magnetic layers 340(a), 340(b) and one non-magnetic lamination layer 342. This is, however, by way of example only as there could be any number of laminations. However, the cost and complexity of constructing the write head 300 increases with increasing number of laminations. In another embodiment of the invention, as shown in FIG. 4, a write head 400 is shown having a trailing return pole 402 that has several laminations. In this embodiment the trailing return pole 402 has 4 magnetic layers 340(a), 340(b), 340(c), 340(d), although the return pole could have any number of magnetic layers 340 and non-magnetic layers 342, such as three magnetic layers 340 or five or more magnetic layers 340. Each magnetic layer 340 is separated from an adjacent magnetic layer (in a region removed from the ABS) by a non-magnetic layer 342(a), 342(b), 342(c). As with the previously described embodiment, the non-magnetic layers 342(a), 342(b), 342(c) terminate short of the ABS, so that magnetic layers 340(a-d) contact one another in the region near the ABS. Again, this structure avoids forming magnetic fields at the ABS (which might write to the media) while still preventing the formation of eddy currents in the trailing return pole.

In order to construct a write head according to the invention, a first magnetic layer (340(a) of FIG. 3 or 4) is formed by electroplating. An ion milling is then performed to remove the electroplating seed layer used to facilitate the electroplating process. Then, a thin non-magnetic layer such as alumina is deposited by a method such as sputtering, ion beam deposition, atomic vapor deposition or chemical vapor deposition. This non-magnetic layer is formed to terminate short of the ABS plane by either a liftoff process or by depositing the non-magnetic layer full film, forming a mask structure over the non-magnetic layer and then ion milling. Then, a second layer of magnetic material is formed by electroplating and another ion milling is performed to remove the seed layer that was used in the second electroplating process. This series of steps can be repeated as often as needed depending on the number of laminations desired.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A perpendicular magnetic write head, comprising:
a magnetic write pole structure having a pole tip extending to an air bearing surface and having a first surface area at the air bearing surface, the magnetic write pole structure being configured to produce a magnetic write field oriented substantially perpendicular to the air bearing surface; and
a magnetic return pole structure extending to the air bearing surface, the magnetic return pole having a second surface area at the air bearing surface that is larger than the first surface area, the magnetic return pole comprising first and second magnetic layers and a non-magnetic layer sandwiched between the first and second magnetic layers, the non-magnetic layer terminating at a location that is recessed from the air bearing surface so that the first and second magnetic layers contact one another at the air bearing surface; wherein
the magnetic return pole structure is magnetically connected with the magnetic write pole structure at a location that is removed from the air bearing surface; and
the magnetic write pole structure further comprises first and second magnetic shaping layers each terminating at a location that is recessed from the air bearing surface and a magnetic write pole located between the first and second magnetic layers and extending to the air bearing surface, the magnetic write pole being separated from each of the first and second magnetic shaping layers by a non-magnetic layer.

2. The perpendicular magnetic write head as in claim 1 wherein the magnetic return pole structure is magnetically connected with the write pole structure in a region removed from the air bearing surface.

3. The perpendicular magnetic write head as in claim 1 wherein the write pole structure further comprises a shaping layer, and wherein the magnetic return pole structure is magnetically connected with the shaping layer in a region removed from the air bearing surface.

4. The perpendicular magnetic write head as in claim 1 wherein the non-magnetic layer comprises alumina.

5. The perpendicular magnetic write head as in claim 1 wherein each of the magnetic layers of the magnetic return pole structure comprises CoFe, NiFe and the non-magnetic layer comprises alumina.

6. The perpendicular magnetic write head as in claim 1 wherein the magnetic return pole is a trailing magnetic return pole located in a trailing direction relative to the magnetic write pole structure.

7. The perpendicular magnetic write head as in claim 1 wherein the magnetic return pole is a trailing magnetic return pole located in a trailing direction relative to the magnetic write pole structure, the perpendicular magnetic write head further comprising a trailing magnetic shield located at the air bearing surface between the write pole structure and the magnetic return pole, the trailing magnetic shield being separated from the write pole structure by a non-magnetic trailing gap layer.

8. The perpendicular magnetic write head as in claim 7 wherein the magnetic return pole is connected with the trailing magnetic shield at the air bearing surface.

9. A perpendicular magnetic write head comprising:
a magnetic write pole structure having a pole tip extending to an air bearing surface and having a first surface area at the air bearing surface, the magnetic write pole structure being configured to produce a magnetic write field oriented substantially perpendicular to the air bearing surface; and
a magnetic return pole structure extending to the air bearing surface, the magnetic return pole having a second surface area at the air bearing surface that is larger than the first surface area, the magnetic return pole comprising three or more magnetic layers and a non-magnetic layer separating each of the magnetic layers from an adjacent one of the magnetic layers in a region recessed from the air bearing surface, the non-magnetic layer terminating at a location that is recessed from the air bearing surface so as to allow contact between the magnetic layers at the air bearing surface; wherein
the magnetic return pole structure is magnetically connected with the magnetic write pole structure at a location that is removed from the air bearing surface; and
the magnetic write pole structure further comprises first and second magnetic shaping layers each terminating at a location that is recessed from the air bearing surface and a magnetic write pole located between the first and second magnetic layers and extending to the air bearing surface, the magnetic write pole being separated from each of the first and second magnetic shaping layers by a non-magnetic layer.

10. The perpendicular magnetic write head as in claim 9 wherein the magnetic return pole structure is magnetically connected with the write pole structure in a region removed from the air bearing surface.

11. The perpendicular magnetic write head as in claim 9 wherein the write pole structure further comprises a shaping layer, and wherein the magnetic return pole structure is magnetically connected with the shaping layer in a region removed from the air bearing surface.

12. The perpendicular magnetic write head as in claim 9 wherein the non-magnetic layer comprises alumina.

13. The perpendicular magnetic write head as in claim 9 wherein each of the magnetic layers of the magnetic return pole structure comprises CoFe, NiFe and the non-magnetic layer comprises alumina.

14. The perpendicular magnetic write head as in claim 9 wherein the magnetic return pole is a trailing magnetic return pole located in a trailing direction relative to the magnetic write pole structure.

15. The perpendicular magnetic write head as in claim 9 wherein the magnetic return pole is a trailing magnetic return pole located in a trailing direction relative to the magnetic write pole structure, the perpendicular magnetic write head further comprising a trailing magnetic shield located at the air bearing surface between the write pole structure and the magnetic return pole, the trailing magnetic shield being separated from the write pole structure by a non-magnetic trailing gap layer.

16. The perpendicular magnetic write head as in claim 15 wherein the magnetic return pole is connected with the trailing magnetic shield at the air bearing surface.

17. A perpendicular magnetic data recording system, comprising:
a magnetic media rotatably mounted within a housing;
an actuator mounted within the housing;

a suspension arm connected with the actuator;
a slider connected with the suspension arm; and
a perpendicular magnetic write head formed on the slider, the perpendicular magnetic write head further comprising:
a magnetic write pole structure having a pole tip extending to an air bearing surface and having a first surface area at the air bearing surface, the magnetic write pole structure being configured to produce a magnetic write field oriented substantially perpendicular to the air bearing surface; and
a magnetic return pole structure extending to the air bearing surface, the magnetic return pole having a second surface area at the air bearing surface that is larger than the first surface area, the magnetic return pole comprising first and second magnetic layers and a non-magnetic layer sandwiched between the first and second magnetic layers, the non-magnetic layer terminating at a location that is recessed from the air bearing surface so that the first and second magnetic layers contact one another at the air bearing surface; wherein the magnetic return pole structure is magnetically connected with the magnetic write pole structure at a location that is removed from the air bearing surface; and
the magnetic write pole structure further comprises first and second magnetic shaping layers each terminating at a location that is recessed from the air bearing surface and a magnetic write pole located between the first and second magnetic layers and extending to the air bearing surface, the magnetic write pole being separated from each of the first and second magnetic shaping layers by a non-magnetic layer.

18. The perpendicular magnetic data recording system as in claim 17 wherein the magnetic return pole structure is a trailing magnetic return pole, the perpendicular magnetic write head further comprising a trailing magnetic shield located at the air bearing surface between the trailing magnetic return pole and the magnetic write pole structure, the trailing magnetic shield being connected with the trailing magnetic return pole and being separated from the magnetic write pole structure by a non-magnetic trailing gap layer.

* * * * *